US011178112B2

(12) United States Patent
Lewin et al.

(10) Patent No.: US 11,178,112 B2
(45) Date of Patent: Nov. 16, 2021

(54) ENFORCING SECURITY POLICIES ON CLIENT-SIDE GENERATED CONTENT IN CLOUD APPLICATION COMMUNICATIONS

(71) Applicant: Microsoft Technology Licensing, LLC, Redmond, WA (US)

(72) Inventors: Guy Lewin, Tel Aviv (IL); Lucy Goldberg, Hertzliya (IL); Yossi Haber, Ganei Tikva (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 210 days.

(21) Appl. No.: 16/519,521

(22) Filed: Jul. 23, 2019

(65) Prior Publication Data
US 2021/0029089 A1 Jan. 28, 2021

(51) Int. Cl.
*H04L 29/06* (2006.01)

(52) U.S. Cl.
CPC ........ *H04L 63/0281* (2013.01); *H04L 63/102* (2013.01); *H04L 63/1408* (2013.01); *H04L 63/20* (2013.01)

(58) Field of Classification Search
CPC .... H04L 63/0281; H04L 63/306; H04L 63/20
See application file for complete search history.

(56) References Cited

U.S. PATENT DOCUMENTS

| 7,523,191 | B1 * | 4/2009 | Thomas | G06F 11/3438 |
| | | | | 709/202 |
| 8,763,103 | B2 * | 6/2014 | Locasto | H04L 63/1441 |
| | | | | 726/8 |
| 9,544,329 | B2 * | 1/2017 | Call | H04L 63/1408 |
| 11,036,526 | B2 * | 6/2021 | Toksoz | G06F 11/3438 |
| 2008/0083012 | A1 * | 4/2008 | Yu | H04L 63/1483 |
| | | | | 726/1 |
| 2010/0138485 | A1 * | 6/2010 | Chow | H04L 67/42 |
| | | | | 709/203 |
| 2013/0086247 | A1 * | 4/2013 | Burckart | H04L 67/2823 |
| | | | | 709/224 |
| 2014/0282464 | A1 * | 9/2014 | El-Gillani | G06F 8/33 |
| | | | | 717/168 |
| 2016/0077824 | A1 * | 3/2016 | Vishnepolsky | H04L 67/02 |
| | | | | 717/172 |

(Continued)

*Primary Examiner* — Douglas B Blair
(74) *Attorney, Agent, or Firm* — Fiala & Weaver P.L.L.C.

(57) ABSTRACT

A proxy server intercepts a message, including a script, from a back-end component of an application, wherein the message is directed to a front-end component of the application executing on a client computing device. The proxy server identifies code in the script that can prompt a download event of a client-side generated content at the client computing device without having to communicate with the back-end component of the application. The proxy server modifies the identified code to cause the front-end component of the application to execute a custom code component for inspecting a download event prompted by the identified code in place of executing the identified code, thereby generating a modified script which is passed to the client computing device. Additionally, the client computing device executes the custom code component configured to inspect the code to determine if the code will prompt the download event of the client-side generated content.

20 Claims, 7 Drawing Sheets

(56) References Cited

U.S. PATENT DOCUMENTS

| | | | |
|---|---|---|---|
| 2016/0350093 A1* | 12/2016 | Walker | H04L 9/3247 |
| 2020/0089880 A1* | 3/2020 | De Los Santos Vilchez | G06F 21/562 |
| 2020/0356661 A1* | 11/2020 | Stoletny | H04L 63/1416 |

* cited by examiner

ENFORCING SECURITY POLICIES ON CLIENT-SIDE GENERATED CONTENT IN CLOUD APPLICATION COMMUNICATIONS

BACKGROUND

The digital arena for nearly all organizations is fueled by enterprise-grade cloud and mobile technology, making the security of that arena a paramount, yet tricky undertaking. These organizations are faced with the unique balancing act of protecting their digital assets while fostering user productivity. To achieve this 'computing equilibrium', companies must have an immediate and clear understanding of who is accessing organizational resources, how those resources are being interacted with, and what user actions are being performed in their cloud computing environments.

This threefold endeavor serves as the cornerstone of user access management and impacts user activity across all environments, from public and private clouds to virtual networks and on-premise servers. Due to this far reaching impact, one approach to user access management for an organization may be to implement automated session control protocols that can limit or restrict what exactly a user can access across web or mobile applications and other enterprise systems depending on various login factors.

From a more granular perspective, this approach can be achieved through a cloud access security broker (CASB), which is a proxy that sits between cloud applications and users of cloud applications, monitoring interactions between the two sides and enforcing security policies during these interactions. For example, a CASB may be able to intercept a user request and, based on a series of access control protocols, determine what the user can access and interact with in regards to the client's resources. In tandem, a CASB can collect important information about the user traffic within the client's computing ecosystem, which provides valuable insights for detecting, diagnosing, and remedying possible security breaches.

This real-time reporting of user traffic, along with robust access control protocols, gives organizations unparalleled visibility and control. For example, a company may grant access to a set of users to upload customer account information to a particular document management system within the organization's virtual network. Additionally, the company may posit, as a customer privacy measure, that no social security information is to be included within that uploaded data. At the same time, the company may want another group of users to be permitted to view this customer information but not be permitted to download any of this specific content to their devices. Conjointly, the company may desire reporting functionality that can detect odd access patterns for the two user groups described above.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein bestow improvements to this technology that optimize visibility and control without reducing productivity or risking application failure. Embodiments described herein include a proxy server, interconnected between a client computing device and an application server, that intercepts a message, including a script, from a back-end component of an application, wherein the message is directed to a front-end component of the application. The proxy server identifies code in the script that can prompt a download event of a client-side generated content at the client computing device without communicating with the back-end component of the application. The proxy server modifies the identified code in the script to cause the front-end component of the application to execute a custom code component for inspecting a download event prompted by the identified code in place of executing the identified code, thereby generating a modified script. In addition, the proxy server provides the modified script to the front-end component of the application.

Moreover, embodiments described herein include a client computing device, interconnected to an application server via a proxy server, that receives a message from the proxy server that includes a script generated by the back-end component of the application for the front-end component of the application. The script includes code that can prompt a download event of a client-side generated content at the client computer without communicating with the back-end component of the application and the code is modified by the proxy server to cause the front-end component of the application to execute a custom code component. The client computing device further executes the custom code component configured to inspect the code to determine if the code will prompt the download event of the client-side generated file, detect a prompting of the download event, and cancel the download event in response to detecting the prompting of the download event.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 3:
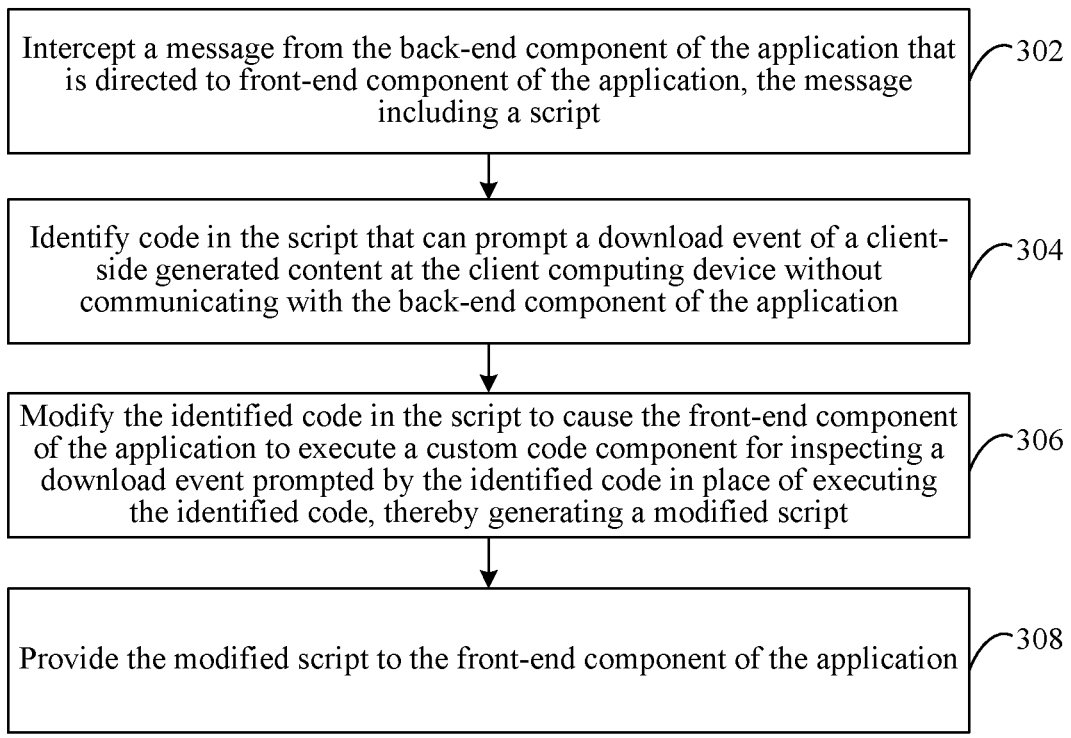

FIG. 3 depicts a flowchart of a method for modifying, at a proxy server interconnected between a client computer and an application server, code in a script included in message from the application server directed to the client computer that can prompt a download event of a client-side generated content at the client computer without communicating with the application server, in accordance with an embodiment.

Figure 4:
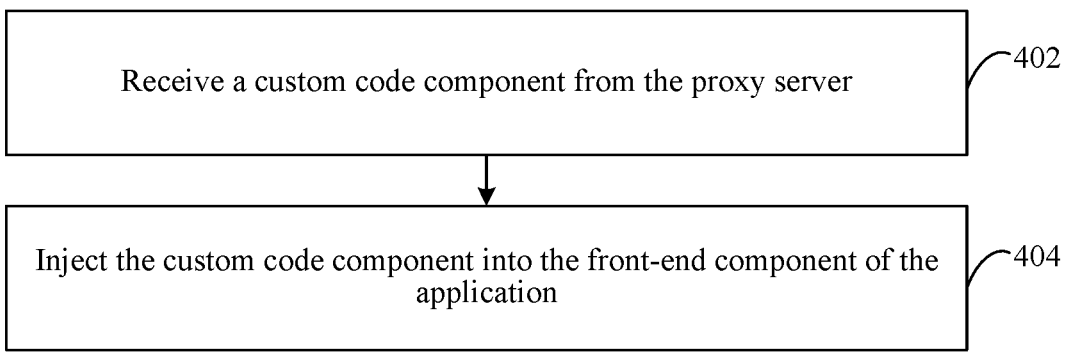

FIG. 4 depicts a flowchart of a method, performed at a client computer, for injecting a custom code component into a front-end component of an application, according to an example embodiment.

Figure 5:
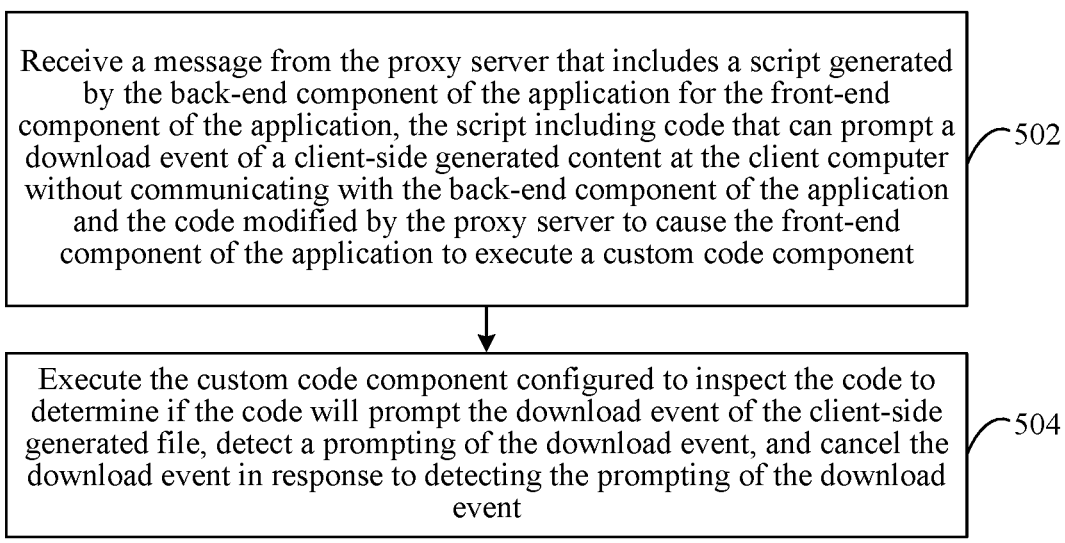

FIG. 5 depicts a flowchart of a method for inspecting, at a client computing device interconnected to an application server via a proxy server, code in a script generated by the application server for a client computing device, which can prompt a download event of a client-side generated content without communicating with the back-end component of the application, according to an example embodiment.

Figure 6:
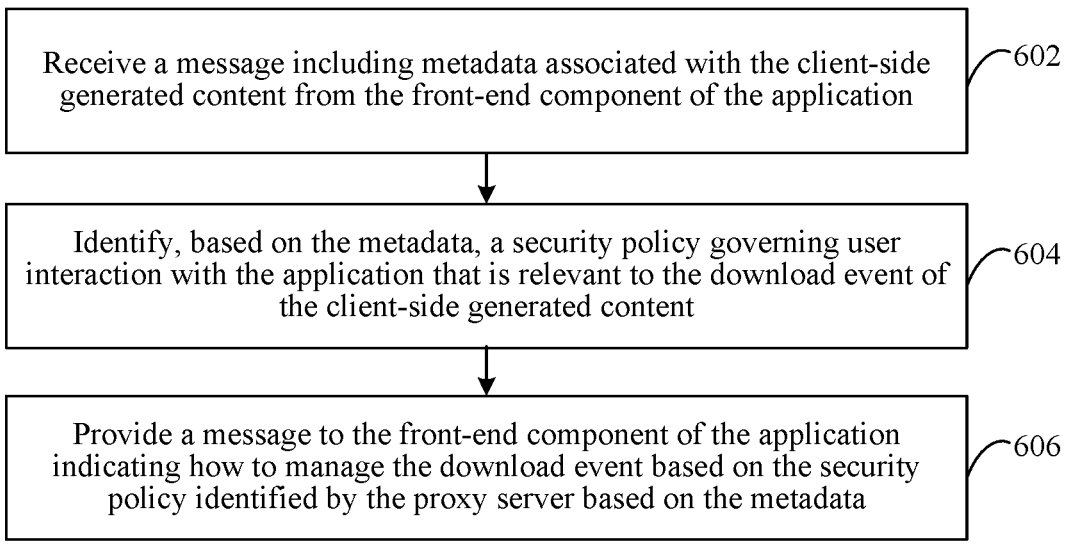

FIG. 6 depicts a flowchart of a method for identifying, based on metadata associated with client-side generated content, a security policy governing user interaction with the application that is relevant to the download event of the client-side generated content, according to an example embodiment.

Figure 7:
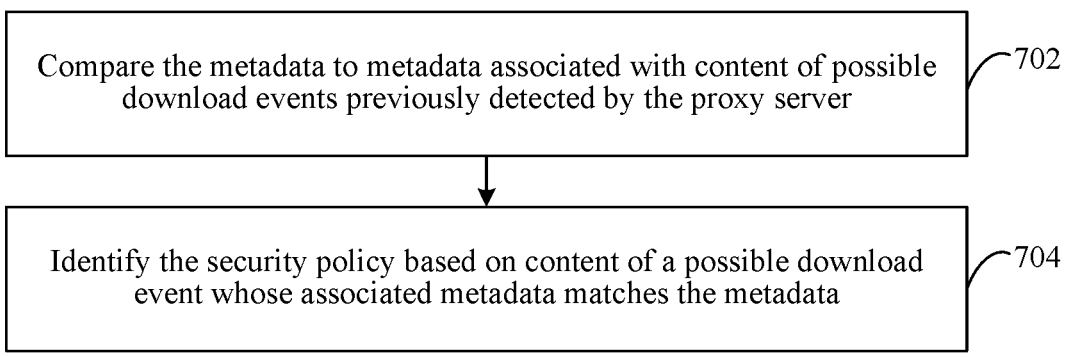

FIG. 7 depicts a flowchart of a method for identifying, based on content of a possible download event whose associated metadata matches the metadata, a security policy governing user interaction with the application that is relevant to the download event of the client-side generated content, according to an example embodiment.

Figure 8:
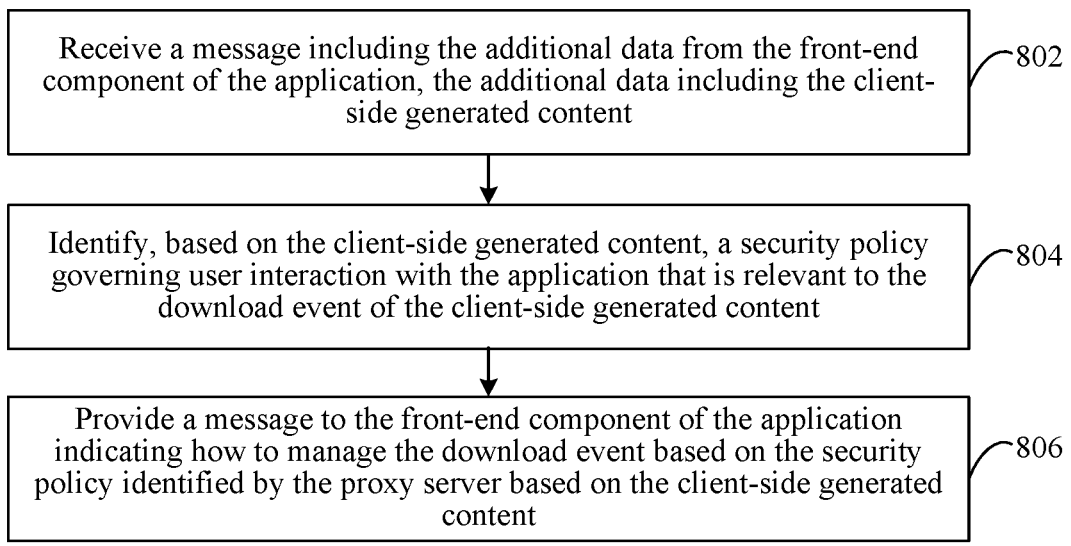

FIG. 8 depicts a flowchart of a method for identifying, based on the client-side generated content, a security policy governing user interaction with the application that is relevant to the download event of the client-side generated content, according to an example embodiment.

Figure 9:
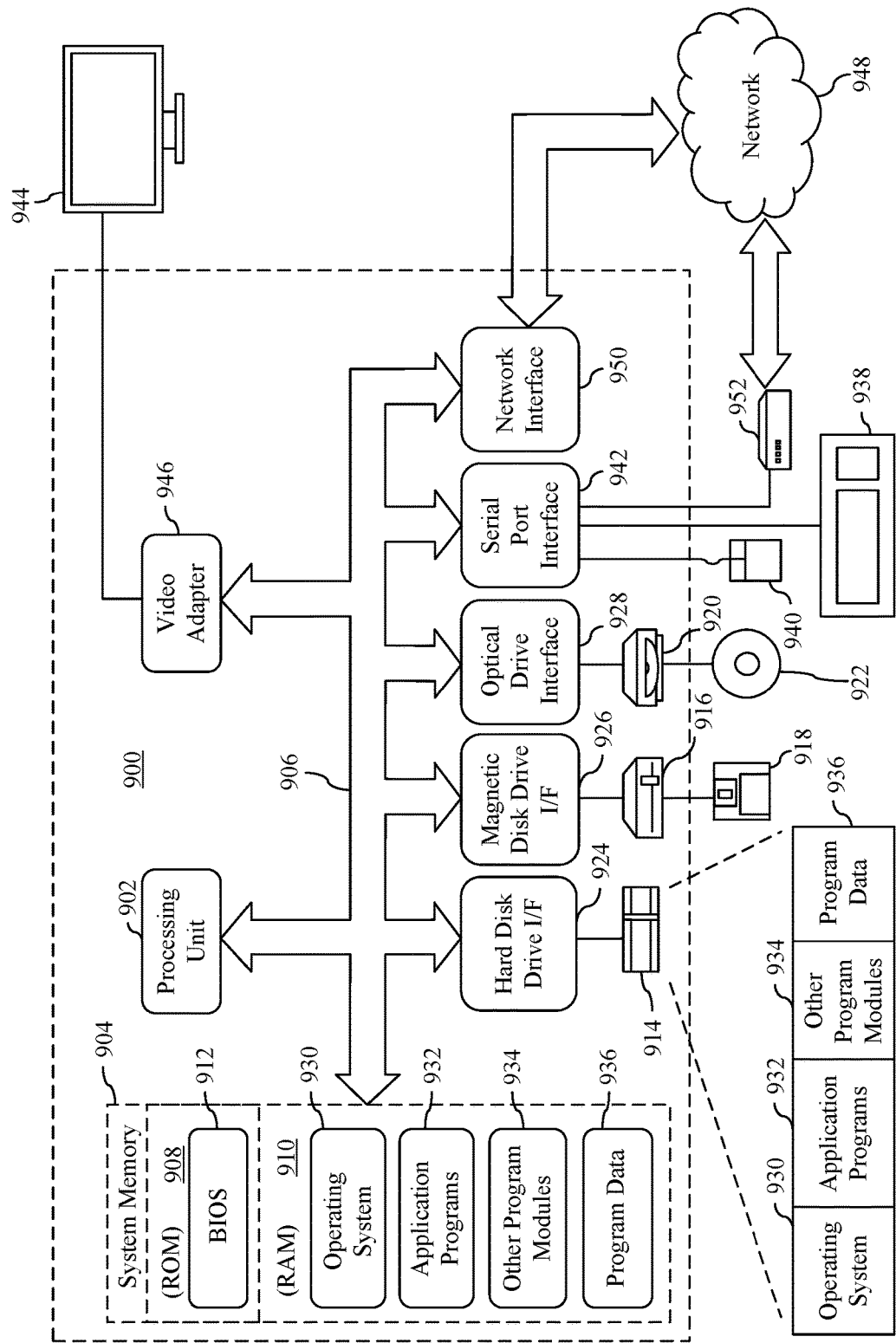

FIG. 9 is a block diagram of an example computing device that may be used to implement embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Systems and Methods for Enforcing Security Policies on Client-Side Generated Content in Cloud Application Communications The digital arena for nearly all organizations is fueled by enterprise-grade cloud and mobile technology, making the security of that arena a paramount, yet tricky undertaking. These organizations are faced with the unique balancing act of protecting their digital assets while fostering user productivity. To achieve this 'computing equilibrium', companies must have an immediate and clear understanding of who is accessing organizational resources, how those resources are being interacted with, and what user actions are being performed in their cloud computing environments.

This threefold endeavor serves as the cornerstone of user access management and impacts user activity across all environments, from public and private clouds to virtual networks and on-premise servers. Due to this far reaching impact, one approach to user access management for an organization may be to implement automated session control protocols that can limit or restrict what exactly a user can access across web or mobile applications and other enterprise systems.

From a more granular perspective, this approach can be achieved through a cloud access security broker (CASB), which is a proxy that sits between cloud applications and users of cloud applications, monitoring interactions between the two sides and enforcing security policies during these interactions. For example, a CASB may be able to intercept a user request and, based on a series of access control protocols, determine what the user can access and interact with in regards to the client's resources. In tandem, a CASB can collect important information about the user traffic within the client's computing ecosystem, which provides valuable insights for detecting, diagnosing, and remedying possible security breaches.

This real-time reporting of user traffic, along with robust access control protocols, gives organizations unparalleled visibility and control. For example, a company may grant access to a set of users to upload customer account information to a particular document management system within the organization's virtual network. Additionally, the company may posit, as a customer privacy measure, that no social security information is to be included within that uploaded data. At the same time, the company may want another group of users to be permitted to view this customer information but not be permitted to download any of this specific content to their devices. Conjointly, the company may desire reporting functionality that can detect odd access patterns for the two user groups described above.

To ensure the enforcement of security policies, a CASB must be able to detect all user activities. However, in some instances, user activity may go undetected and allow for security policy enforcement mechanisms to be bypassed. For example, a client-side generated file can be downloaded at a client computer without the CASB detecting the download. To help illustrate, a user may interact with a front-end component of an application (e.g., a web page rendered by a browser in the case of a web application) that has information displayed on the web page and click a "save" button to save a file associated with the application. Conventionally, the CASB will manage an interaction between the cloud application server and the client device by requesting the file from the cloud application server and providing the requested file to the browser on the client device for interfacing.

However, with the advancement in browser technology and for improved efficiency, if the information that is needed is already rendered in the browser, the browser or user interface may generate the file without contacting the application server when content is prompted to be saved at the browser. There is no need to issue a request to the application server because all the content that is needed is already displayed on the web page. If the user download is not detected, then relevant security policies may not be enforced, such as encrypting the file for download or blocking the download entirely.

Embodiments described herein bestow improvements to this technology that optimize visibility and control without reducing productivity or risking application failure. Embodiments described herein include a proxy server, interconnected between a client computing device and an application server, that intercepts a message, including a script, from a back-end component of the application, wherein the message is directed to a front-end component of the application. The proxy server identifies code in the script that can prompt a download event of a client-side generated content at the client computing device without communicating with the back-end component of the application. The proxy server modifies the identified code in the script to cause the front-end component of the application to execute a custom code component for inspecting a download event prompted by the identified code in place of executing the identified code, thereby generating a modified script. In addition, the proxy server provides the modified script to the front-end component of the application.

Moreover, embodiments described herein include a client computing device, interconnected to an application server via a proxy server, that receives a message from the proxy server that includes a script generated by the back-end component of the application for the front-end component of the application. The script includes code that can prompt a download event of a client-side generated content at the client computer without communicating with the back-end component of the application and the code is modified by the proxy server to cause the front-end component of the application to execute a custom code component. The client computing device further executes the custom code component configured to inspect the code to determine if the code will prompt the download event of the client-side generated file, detect a prompting of the download event, and cancel the download event in response to detecting the prompting of the download event.

Figure 1:
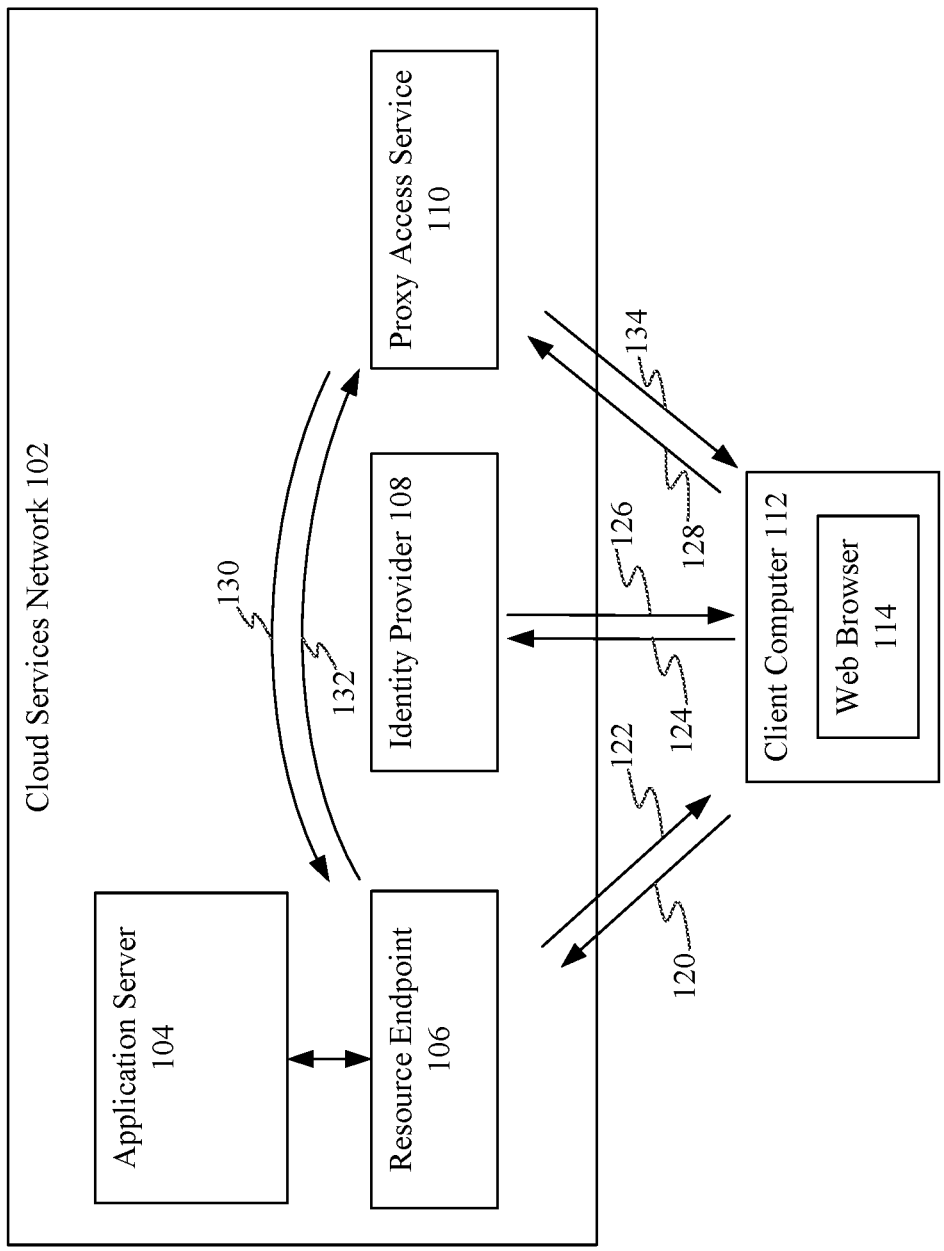
FIG. 1 is a block diagram of an example system that enables redirection of requests for a cloud application from the cloud application to a proxy access service, in accordance with an embodiment.

To help illustrate this, FIG. 1 will now be described. In particular, FIG. 1 is a block diagram of an example system 100 that enables redirection of requests for a cloud application from the cloud application to a proxy access service while a user's proxy session is active. As shown in FIG. 1, system 100 includes a cloud services network 102 and a client computer 112. As further shown in FIG. 1, cloud services network 102 includes an application server 104, a resource endpoint 106, an identity provider 108, and a proxy access service 110, and client computer 112 includes a web browser 114.

In FIG. 1, cloud services network 102 hosts an application in which resources associated with the application are stored on application server 104. The application may be of any type of web accessible application/service, such as a database application, a social networking application, a messaging application, a financial services application, a news application, a search application, a web-accessible productivity application, a cloud storage and/file hosting application, or the like. Although cloud services network 102 of FIG. 1 is shown to host one application, it is to be understood that the techniques described herein may apply to cloud services networks that host more than one application. Application server 104 may include one or more server devices and/or other computing devices.

Resource endpoint 106 may serve as a login endpoint for a resource of a cloud application and indicate where the resource can be accessed by a client device on application server 104. Identity provider 108 may create, maintain, and manage identity information associated with users while providing authentication services to relying cloud applications and/or services, and proxy access service 110 may monitor and manage interactions between cloud applications and users of these cloud applications, Web browser 114 executing on client computer 112 may enable interactions between a user of client computer 112 and cloud applications.

Each component of cloud services network 102 and client computer 112 may be communicatively connected via one or more networks (not pictured in FIG. 1). These one or more networks may include, for example, a local area network (LAN), a wide area network (WAN), a personal area network (PAN), and/or a combination of communication networks, such as the Internet.

Client computer 112 may be any type of stationary or mobile computing device, including a mobile computer or mobile computing device (e.g., a smart phone, a laptop computer, a notebook computer, a tablet computer such as an Apple iPad™, a netbook, etc.), a wearable computing device (e.g., a smart watch, a head-mounted device including smart glasses such as Google® Glass™, etc.), or a stationary computing device such as a desktop computer or PC (personal computer).

As depicted in FIG. 1, resource endpoint 106 (associated with a resource of the application hosted in cloud services network 102) may receive a request 120 from client computer 112 originating in web browser 114 (e.g., by issuing a uniform resource locator (URL) of the application in web browser 114). For the sake of illustration, assume request 120 is a request for access to the resource (e.g., web pages, e-mail, information from databases, or web services) of the application on behalf of a user of client computer 112.

In response to receiving request 120, resource endpoint 106 may determine that the user has not yet been authenticated and may therefore provide a response 122 to web browser 114 that causes web browser 114 to send a request 124 to identity provider 108 for user authentication. For instance, resource endpoint 106 may redirect web browser 114 to identity provider 108 in response to determining that a token, which enables resource endpoint 106 to determine whether the user should be granted access to the resource, was not provided with request 120.

After receiving request 124, identity provider 108 may determine based on an access policy whether web browser 114 should access the resource via proxy access service 110. An access policy may outline which users or groups of users' and what applications' network cloud traffic should be routed to proxy access service 110 for monitoring and/or managing. In embodiments, an information technology (IT) administrator for an organization may set access policies for applications and users of client devices that access a computer network of the organization (e.g., contract employees of the organization). For example, identity provider 108 may evaluate a user's login (e.g., username and password) to determine if there is a policy associated with that user and establish that a particular user is a contract employee based on the contract employee's username including an indicator of her employment status.

Identity provider 108 may further authenticate the user associated with request 124 and create a token that can be used to determine whether the user should be granted access to the resource. In some embodiments, during authentication, a user may be prompted by identity provider 108 to provide his or her user login credentials. After determining that web browser 114 should access the resource via proxy access service 110, identity provider 108 may send a response 126 to web browser 114 that includes an encrypted version of the token and that redirects web browser 114 to send a request 128 to proxy access service 110 that includes such encrypted token.

After receiving redirected request 128, proxy access service 110 may decrypt the token and then generate a corresponding request 130 that includes the decrypted token and provide it to resource endpoint 106. Resource endpoint 106 may grant or deny access to the resource located on application server 104 based on the token. If access is granted, application server 104 may interpret request 130, generate a response 132 to request 130, and issue response 132 to proxy access service 110. In some embodiments, response 132 may include a file stored on application server 104 or an output from a program executing on application server 104. In other embodiments, response 132 may include an error message if the request could not be fulfilled.

After receiving response 132, proxy access service 110 may generate a response 134 and send it to web browser 114. In response to receiving response 134, web browser 114 may interpret response 134 and display contents of response 134 on a window of web browser 114 for the user of client computer 112. Response 134 may be the same as response 132 or augmented by proxy access service 110 based on security policies (discussed in greater detail herein).

Any further requests related to accessing the resource of application server 104a and originating in web browser 114 during the user's proxy session may be directed to proxy access service 110, and any responses generated by proxy access service 110 to the further requests may be issued to web browser 114 by proxy access service 110 on behalf of resource endpoint 106. A suffix proxy may be implemented in system 100 to keep the user within the session. Suffix proxies permit the user to access resources by including the name of a proxy server to the requested resource URL. For example, relevant URLs for the application hosted in cloud services network 102 may be replaced with unique URLs. To illustrate, if a webpage is a requested resource of a target application which has a domain of targetapplication.com, the link to the webpage may appear as: targetapplication.com.proxyserver.

To help further illustrate the functionalities provided by proxy access service 110 in accordance with embodiments, FIG. 2 will now be described. In particular, FIG. 2 is a block diagram of an example system 200 in which a proxy server is interconnected between a client computing device and an application server, where the proxy server executes a proxy access service, the client computing device executes a front-end component of an application, and the application server executes a back-end component of the application.

Figure 2:
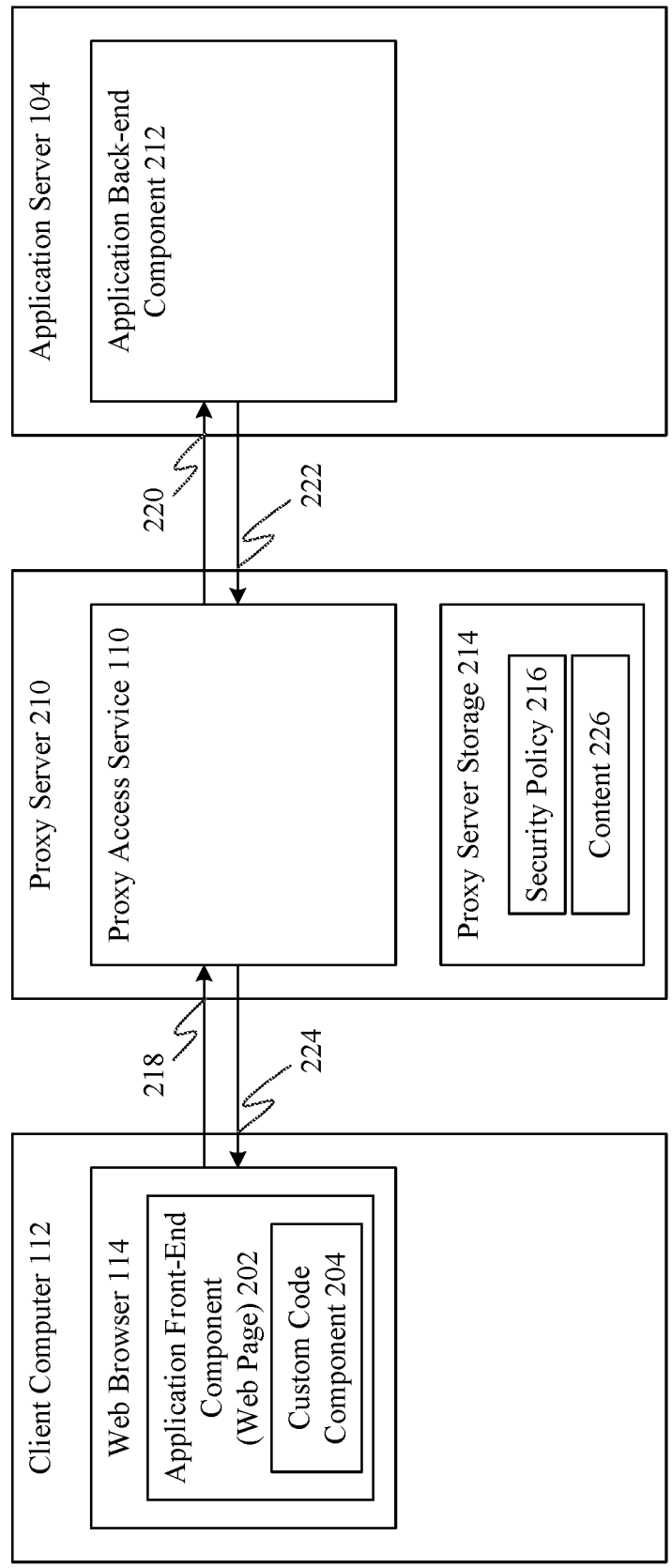
FIG. 2 is a block diagram of an example system in which a proxy server is interconnected between a client computing device and an application server, where the proxy server executes a proxy access service, the client computing device executes a front-end component of an application, and the application server executes a back-end component of the application, in accordance with an embodiment.

As shown in FIG. 2, system 200 includes: a proxy server 210, client computer 112, and application server 104, the last two being described in FIG. 1. As further shown in FIG. 2, proxy server 210 includes proxy access service 110, as described in FIG. 1, and a proxy server storage 214, which stores a security policy 216 and content 226. Additionally depicted in FIG. 2, client computer 112 includes web browser 114, as described in FIG. 1 and further includes an application front-end component 202 and a custom code component 204. Lastly, shown in FIG. 2, application server 104 includes an application back-end component 212.

Proxy server 210 may be communicatively interconnected between client computer 112 and application server 104 via one or more networks (not pictured in FIG. 2). These one or more networks may include, for example, a local area network (LAN), a wide area network (WAN), a personal area network (PAN), and/or a combination of communication networks, such as the Internet. Proxy server 210 may establish itself as an intermediary for client computer 112 and application server 104 using the process described in FIG. 1 for establishing a redirection of requests made by a client computer for an application to a proxy server. Proxy server 210 may also comprise one or more server devices and/or other computing devices.

Application front-end component 202 and application back-end component 212 are example components of the cloud application hosted in cloud services network 102 described in FIG. 1. As shown in FIG. 2, application front-end component 202 may be represented as a web page displayed in web browser 114. In other embodiments, application front-end component 202 may also be an Internet-enabled application executing on client computer 112. Still other implementations of application front-end component 202 are possible.

Proxy access service 110 running on proxy server 210 may be configured to intercept messages sent between application front-end component 202 and application back-end component 212. For example, proxy access service 110 intercepts request 218 sent from application front-end component 202 to application back-end component 212. For this interception to occur, an identity provider, relied upon by the application for identity provider services, may have determined based on an access policy that request 218 should be redirected to proxy access service 110. For example, the identity provider may identify an access policy associated with a user of client computer 112 and/or the application. As such, any requests sent from application front-end component 202 to application back-end component 212 will be redirected to proxy access service 110 during the user's active proxy session.

Proxy access service 110 running on proxy server 210 may be further configured to modify intercepted messages sent between application front-end component 202 and application back-end component 212. For example, in response to receiving and after interpreting a request 218 from application front-end component 202, proxy access service 110 may issue a corresponding request 220, requesting application back-end component 212 to fulfill request 218. After receiving response 222 to corresponding request 220, proxy access service 110 may modify response 222 received from application back-end component 212 and send a modified response 224 to application front-end component 202.

More specifically, in accordance with embodiments described herein, proxy access service 110 may modify code in a script included in response 222 that can prompt a download event of a client-side generated content at client computer 112 without communicating with application back-end component 212. The code that can prompt the download event may be modified to cause inspection of the potential download event at client computer 112 instead of executing the code from application back-end component 212. If the download event occurs at client computer 112 without communication with application back-end component 212, the proxy access service 110 will be unable to monitor the download event and the download event will go unreported and any relevant security policies will not be applied to the download event.

To explore this in further detail, FIG. 3 is described. FIG. 3 depicts a flowchart 300 of a method for modifying, at a proxy server interconnected between a client computer and an application server, code in a script included in message from the application server directed to the client computer that can prompt a download event of a client-side generated content at the client computer without communicating with the application server, according to an example embodiment. FIG. 3 will be described with continued reference to FIG. 2. However, other structural and operational embodiments will be apparent to persons skilled in the relevant art(s) based on the following discussion regarding flowchart 300.

As shown in FIG. 3, the method of flowchart 300 begins at step 302. In step 302, a message is intercepted from the back-end component of the application that is directed to front-end component of the application, where the message includes a script. For example, and with continued reference to FIG. 2, proxy access service 110 intercepts response 222 from application back-end component 212, which may include a script that enables fulfilling request 218 of application front-end component 202.

At step 304 in flowchart 300, code is identified in the script that can prompt a download event of a client-side generated content at the client computing device without communicating with the back-end component of the application. For example, and with continued reference to FIG. 2, after intercepting response 222, proxy access service 110 may identify code in the script that can prompt a download event of a client-side generated content at client computer 112 without communicating with application back-end component 212. Proxy access service 110 may parse the code of the script looking for commands, function calls, and/or setting of variables that can prompt a download event of client-side generated content at client computer 112. In some embodiments, proxy access service 110 may use an abstract syntax tree (AST) to identify code that can prompt a download event of a client-side generated content. An AST is a tree representation of the abstract syntactic structure of code written in a programming language. Each node of the AST may denote a construct occurring in the code. For example, proxy access service 110 may build an AST of the code of the script and traverse the AST looking for nodes that include commands, function calls, and/or setting of variables that can prompt a download event of client-side generated content at client computer 112 without communicating with application back-end component 212.

At step 306 in flowchart 300, the identified code in the script is modified to cause the front-end component of the application to execute a custom code component for inspecting a download event prompted by the identified code in place of executing the identified code and thereby generating a modified script. For example, and with continued reference to FIG. 2, proxy access server 110 may modify the script by "wrapping" the identified code with replacement functions or "hooks". Hooks are code that may handle intercepted function calls, events, or messages. By wrapping the identified code, proxy access server 110 causes application front-end component 202 to execute custom code component 204 for inspecting the download event prompted by the identified code. Custom code component 204 defines the replacement functions or hooks, which are executed at client computer 112 in place of the identified code generated by application back-end component 212.

At step 308 in flowchart 300, the modified script is provided to the front-end component of the application. For example, and with continued reference to FIG. 2, after modifying the script generated by application back-end component 212, proxy access service 110 may provide the modified script to application front-end component 202 via response 224.

To execute custom code component 204 at client computer 112, proxy access service 110 is configured to provide custom code component 204 to application front-end component 202. To help elaborate on this, FIG. 4 will now be described. FIG. 4 depicts a flowchart 400 of a method, performed at a client computer, for injecting a custom code component into a front-end component of an application, according to an example embodiment. FIG. 4 will be described with continued reference to FIG. 2. However, other structural and operational embodiments will be apparent to persons skilled in the relevant art(s) based on the following discussion regarding flowchart 400.

As shown in FIG. 4, the method of flowchart 400 begins at step 402. In step 402, a custom code component is received from the proxy server. For example, and with continued reference to FIG. 2, application front-end component 202 may receive custom code component 204 from proxy access service 110 via response 224. To help further illustrate, in some embodiments, web browser 114 may issue request 218 for a web page of application front-end component 202. Proxy access service 110 may then issue request 220 to obtain the web page from application server 104. After receiving the web page via response 222, proxy access service 110 may append custom code component 204 to the web page (e.g., by including custom code component 204 in the HTML file representing the web page of application front-end component 202) and provide it web browser 114 via response 224.

At step 404 in flowchart 400, the custom code component is injected into the front-end component of the application. For example, and with continued reference to FIG. 2, after response 224 is received and interpreted by web browser 114, the web page of application front-end component 202 containing custom code component 204 is displayed, enabling custom code component 204 to be executed in web browser 114.

In embodiments, custom code component 204 may also define one or more parameters useful in inspecting code that can prompt a downloading of a client-side generated content without communicating with application back-end component 212. For example, custom code component 204 may define a parameter indicating if there are any security policies governing user interaction with application front-end component 202. A security policy may define which characteristics of network cloud traffic should be managed and what actions need to be taken in managing the network cloud traffic. Before providing the web page of application front-end component 202 containing custom code component 204 to web browser 114, proxy access service 110 may set or clear the parameter to indicate whether there are any active security policies governing user interaction with application front-end component 202. In some embodiments, custom code component 204 may be injected as part of the regular loading of a main web page of an application.

After custom code component 204 is injected into application front-end component 202, application front-end component 202 may execute custom code component 204 to inspect any code identified by proxy access service 110 which can prompt the download of client-side generated content. To explore this further, FIG. 5 is described. FIG. 5 depicts a flowchart 500 of a method for inspecting, at a client computing device interconnected to an application server via a proxy server, code in a script generated by the application server for a client computing device, which can prompt a download event of a client-side generated content without communicating with the back-end component of the application, according to an example embodiment. FIG. 5 will be described with continued reference to FIG. 2. However, other structural and operational embodiments will be apparent to persons skilled in the relevant art(s) based on the following discussion regarding flowchart 500.

As shown in FIG. 5, the method of flowchart 500 begins at step 502. In step 502, a message is received from the proxy server that includes a script generated by the back-end component of the application for the front-end component of the application. The script includes code that can prompt a download event of a client-side generated content at the client computer without communicating with the back-end component and the code is modified by the proxy server to cause the front-end component of the application to execute a custom code component. For example, and with continued reference to FIG. 2, application front-end component 202 may receive response 224 provided to fulfill request 218. Response 224 may include a script generated by application back-end component 212 for application front-end component 202. The script may include code that can prompt a download event of a client-side generated content at client computer 112 without communicating with application back-end component 212. As described with reference to FIG. 3, proxy access service 110 may modify the code in the script that can prompt a download event of a client-side generated content to execute custom code component 204 in place of executing the code generated by application back-end component 212.

At step 504 in flowchart 500, the custom code component is executed and the custom code component is configured to inspect the code to determine if the code will prompt the download event of the client-side generated file, detect a prompting of the download event, and cancel the download event in response to detecting the prompting of the download event. For example, and with continued reference to FIG. 2, application front-end component 202 executes custom code component 204 configured to inspect the code identified by proxy access service 110 to determine if the code will prompt the download event at client computer 112. Custom code component 204 may examine the code identified by proxy access service 110 by looking for commands, function calls, and/or setting of variables that will prompt a download event of client-side generated content at client computer 112.

To help illustrate, assume the script generated by application back-end component 212 includes code in the programming language of JavaScript, a scripting language that enables user interaction with web pages. One way in which content generated by a JavaScript at a client device can be downloaded is by using "blobs" and "object URLs". For example, using the URL.createObjectURL( ) method, an object URL is created that represents a blob object. Blobs are objects that are used to represent raw, immutable data that is not necessarily in a JavaScript-native format. The method takes a blob object as its argument and returns a URL representing the passed blob object. Next, an HTML anchor element (<a></a>) is created and the href attribute of the anchor element is set to the created object URL, creating a download link that can be clicked in order to download the content of the blob. Anchor elements are useful for adding hyperlinks to other resources and documents from an HTML document. The URL of the linked resource is specified in the href attribute of the anchor element. As such, in accordance with this particular example scenario, custom code component 204 may inspect the code identified by the proxy access service 110 specifically looking for code that sets an href attribute to a blob URL. If prompted, this code will enable a download of client-side generated content without communicating with application back-end component 212.

With continued reference to the example scenario discuss above, to detect if the download event has been prompted, custom code component 204 may set a JavaScript event listener on the anchor element that fires when a "click" on the anchor element occurs. Once the event listener detects a click (e.g., a programmatically triggered click or a user clicking a button) to prompt the download event, custom code component 204 may cancel click so the download event is not prompted.

JavaScript dynamically generates new content inside the browser to be displayed. For example, JavaScript creates a new HTML table and fills it with data requested from the application server, and then displays the table in a web page shown to the user of a client device. Thus, inspection of the identified code is needed at the client device because of the continuous manipulation of the code at the client device that allows for dynamic updates to web pages. A proxy server would be unable to identify code that can prompt a download event of client-generated content that is dynamically generated at the client device.

In other embodiments, functions may be called to prompt the download of client-side generated content that do not require a click to prompt the download event. In these instances, a replacement function included in custom component 204 will be called instead of the function generated by the back-end component of the application.

In embodiments, custom code component 204 may check to see if there are any security policies governing user interaction with the application before interrupting the download event. For example, custom code component 204 may check a parameter to determine if there are any active security policies governing user interaction with the application before inspecting the code and canceling the download event. As described above, proxy access service 110 sets the parameter before custom code component 204 is provided to application front-end component 202. If the parameter does not indicate that there are any active security policies, proxy access service 110 will not interrupt a user's browsing session. Each time a web page is refreshed the parameter may be updated to indicate if there are any active security policies. Additionally, custom code component 204 may periodically check with proxy access service 110 to inquire if there are any active security policies governing user interaction with the application and update the parameter accordingly. At any point during a user's browsing session, a security policy may be enacted or updated. Thus, to ensure the continuous enforcement of security policies, custom code component 204 needs to keep the parameter indicating if there are any active security policies governing user interaction with the application current.

After determining there is an active security policy, the content needs to be examined to determine if a security policy is relevant to the download event. To explore this further, FIGS. 6-8 will be described. FIG. 6 depicts a flowchart 600 of a method for identifying, based on metadata associated with client-side generated content, a security policy governing user interaction with the application that is relevant to the download event of the client-side generated content, according to an example embodiment. FIG. 6 will be described with continued reference to FIG. 2. However, other structural and operational embodiments will be apparent to persons skilled in the relevant art(s) based on the following discussion regarding flowchart 600.

As shown in FIG. 6, the method of flowchart 600 begins at step 602. In step 602, a message including metadata associated with the client-side generated content is received from the front-end component of the application. For example, and with continued reference to FIG. 2, proxy access service 110 may receive via a message from application front-end component 202 (e.g. message 218) metadata associated with the client-side generated content from application front-end component 202. In embodiments, custom code component 204 may obtain the client-side generated content stored locally on client computer 112 through web browser 114 and provide the metadata associated with the client-side generated content to proxy access service 110. The metadata may include any of the following: a name, a size, and a hash associated with the client-side generated content. Custom code component 204 may also be configured to hash the client-side generated content. In some instances, for efficiency, custom code component 204 may only hash a first portion of the client-side generated content (e.g., the first 100 MB of data).

Custom code component 204 may provide the metadata to proxy access service 110 using an HTTP GET request, where the metadata is sent to proxy access service 110 in the URL of a GET request. Additionally, custom code component 204 may provide the metadata to proxy access service 110 using an HTTP POST request, where the metadata is stored in the request body of the HTTP request. In embodiments, custom code component 204 may also define a parameter indicating a maximum metadata upload size. Before causing custom code component 204 to be injected into application front-end component 202, proxy access service 110 may set the parameter indicating a maximum size (e.g., 1 GB of data) of the metadata that can be uploaded to proxy server 210.

At step 604 in flowchart 600, a security policy governing user interaction with the application that is relevant to the download event of the client-side generated content is identified based on the metadata. For example, and with continued reference to FIG. 2, after receiving the metadata, proxy access service 110 may determine if a security policy is relevant to the download event of the client-side generated content based on the metadata. The metadata may be provided to proxy access service 110 before the client-side generated content is provided. In the instances that the security policy is relevant to the download event but unconnected to the content, the content will not needlessly be uploaded to the proxy server 210. For example, a security policy may pertain to blocking the downloads of files of certain sizes or of certain format types.

Proxy access service 110 may further block an action or generate/modify a response based on security policy 216 stored in proxy server storage 214. A security policy may define which characteristics of network cloud traffic should be managed and what actions need to be taken in managing the network cloud traffic. Some examples of the characteristics include: device identification such as identifying that a request is issued by an unmanaged client device; location information of cloud applications seeking to be accessed; confidentiality classifications of resources associated with a request; and sensitivity levels of content of resources associated with a request, Additionally, some examples of actions need to be taken in managing the network cloud traffic include: allowing unrestricted access to a cloud application but monitoring the interaction between users and the cloud application; blocking the download of a resource; and providing further protection to a resource by encrypting content of a resource being uploaded to a cloud. application. A security administration of an organization may set these control policies.

At step 606 in flowchart 600, a message is sent to the front-end component of the application indicating how to manage the download event based on the security policy identified based on the metadata. For example, and with continued reference to FIG. 2, once a relevant security policy has been identified, proxy access service 110 may instruct application front-end component 202 via a message (e.g., message 224) on how to manage the download event. In embodiments, the response from proxy access service 110 may include a code that represents the action that is needed to be taken to manage the download event and custom code component 204 may decipher the code and taken the appropriate steps to manage the download.

Proxy access service 110 may indicate how to manage the download event in one of the following manners, although these examples are not intended to be limiting: allow the download event; block the download event; protect the client-side generated content; or request more data relating to the download event. Proxy access service 110 may find that the download event does not violate a security policy and indicate to custom code component 204 to allow the download. Custom code component 204 may allow the download by executing the original code generated by application back-end component 212.

In some embodiments, if proxy access service 110 indicates blocking the download event, proxy access service 110 may include via a message (e.g., message 224) a "fake" file for download that indicates the reason the client-side generated content cannot be downloaded. Proxy access service 110 may also indicate to custom code component 204 that the content needs to be protected. For example, the data could be encrypted and only allowed to be viewed by the current user.

FIG. 7 will now be described. FIG. 7 depicts a flowchart 700 of a method for identifying, based on content of a possible download event whose associated metadata matches the metadata, a security policy governing user interaction with the application that is relevant to the download event of the client-side generated content, according to an example embodiment. FIG. 7 will be described with continued reference to FIG. 2. However, other structural and operational embodiments will be apparent to persons skilled in the relevant art(s) based on the following discussion regarding flowchart 700.

As shown in FIG. 7, the method of flowchart 700 begins at step 702. In step 702, the metadata is compared to metadata associated with content of possible download events previously detected by the proxy server. For example, and with continued reference to FIG. 2, proxy access service 110 may compare the metadata associated the client-side generated content to metadata associated with content of possible download events previously detected by proxy access service 110. Any content 226 associated with a download event detected by proxy access service 110 that was uploaded to proxy access server 210 may be stored in proxy server storage 214. If proxy access service 110 finds a match between the metadata of the client-side generated content with metadata of any content 226 stored in proxy server storage 214, then the client-side generated content has been previously uploaded to proxy server 210 and proxy access service 110 may use content 226 to identify if any security policies are relevant to the download event without the client-side generated content being uploaded to the server again. Proxy access service 110 may compare metadata such as file name, file size, and hashes associated with each content.

At step 704 in flowchart 700, the security policy is identified based on content of a possible download event whose associated metadata matches the metadata. For example, and with continued reference to FIG. 2, if proxy access server 110 finds matches between the metadata of the client-side generated content and with metadata of any content 226 stored in proxy server storage 214, proxy access service 110 may identify a security policy that is relevant to the download event of the client-side generated content based on content 226. Once a relevant security policy has been identified, proxy access service 110 may instruct application front-end component 202 via message 224 on how to manage the download event. As described previously, the response from proxy access service 110 may include a code that represents the action that is needed to be taken to manage the download event and custom code component 204 may decipher the code and taken the appropriate steps to manage the download.

In the instance that the proxy access service 110 cannot identify a relevant security policy based on the metadata, the proxy access service 110 can request more data relating to the download event from application front-end component 202. FIG. 8 depicts a flowchart 800 of a method for identifying, based on the client-side generated content, a security policy governing user interaction with the application that is relevant to the download event of the client-side generated content, according to an example embodiment. FIG. 8 will be described with continued reference to FIG. 2. However, other structural and operational embodiments will be apparent to persons skilled in the relevant art(s) based on the following discussion regarding flowchart 800.

As shown in FIG. 8, the method of flowchart 800 begins at step 802. In step 802, a message including the additional data from the front-end component of the application is received, where the additional data including the client-side generated content. For example, and with continued reference to FIG. 2, in the instance that the proxy access service 110 cannot identify a relevant security policy based on the metadata associated with the client-side generated content, the proxy access service 110 can request more data relating to the download event via response 224. Proxy access service 110 may receive a message, via request 218 including the additional data from application front-end component 202. The additional data may include the client-side generated content.

At step 804 in flowchart 800, a security policy governing user interaction with the application that is relevant to the download event of the client-side generated content is identified based on the client-side generated content. For example, and with continued reference to FIG. 2, after client-side generated content is upload to proxy server 210, proxy access service 110 may identify a security policy governing user interaction with the application that is relevant to the download event of the client-side generated content based on the client-side generated content.

At step 806 in flowchart 800, a message is provided to the front-end component of the application indicating how to manage the download event based on the security policy identified by the proxy server based on the client-side generated content. For example, and with continued reference to FIG. 2, once a relevant security policy has been identified, proxy access service 110 may instruct application front-end component 202 via message 224 on how to manage the download event. As described previously, the response from proxy access service 110 may include a code that represents the action that is needed to be taken to manage the download event and custom code component 204 may decipher the code and taken the appropriate steps to manage the download.

III. Example Computer System Implementation

FIG. 9 depicts an example processor-based computer system 900 that may be used to implement various embodiments described herein, such as any of the embodiments described in the Sections above and in reference to FIGS. 1-8. For example, processor-based computer system 700 may be used to implement any of the components of systems 100 and 200 as described above in reference to FIGS. 1 and 2 as well as any of the flowcharts described above in reference to FIGS. 3-8. The description of system 900 provided herein is provided for purposes of illustration and is not intended to be limiting. Embodiments may be implemented in further types of computer systems, as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing the systems described above, including the embodiments described in reference to FIGS. 1-8.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 806 via serial port interface 942, as shown in FIG. 9, or may be connected to bus 906 using another interface type, including a parallel interface.

As used herein, the terms "computer program medium," "computer-readable medium," and "computer-readable storage medium" are used to generally refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media (including system memory 904 of FIG. 9). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 952, or any other interface type. Such computer programs, when executed or loaded by an application, enable computing device 900 to implement features of embodiments discussed herein. Accordingly, such computer programs represent controllers of the computing device 900.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Exemplary Embodiments

In an embodiment a system includes: a proxy server interconnected between a client computing device and an application server, the client computing device executing a front-end component of an application and the application server executing a back-end component of the application, the proxy server being configured to: intercept a message from the back-end component of the application that is directed to front-end component of the application, the message including a script; identify code in the script that can prompt a download event of a client-side generated content at the client computing device without communicating with the back-end component of the application; modify the identified code in the script to cause the front-end component of the application to execute a custom code component for inspecting a download event prompted by the identified code in place of executing the identified code, thereby generating a modified script; and provide the modified script to the front-end component of the application.

In an embodiment of the foregoing system, the proxy server is further configured to: set a parameter indicating that there is a security policy governing user interaction with the application, the parameter included in the custom code component; and cause the custom code component to be injected into the front-end component of the application.

In an embodiment of the foregoing system, the proxy server is further configured to: receive a message from the front-end component of the application inquiring if there are any security policies governing user interaction with the application; identify that there is security policy governing user interaction with the application; and provide a message to the front-end component of the application indicating that there is the security policy governing user interaction with the application.

In an embodiment of the foregoing system, the proxy server is further configured to: receive a message including metadata associated with the client-side generated content from the front-end component of the application; identify, based on the metadata, a security policy governing user interaction with the application that is relevant to the download event of the client-side generated content; and provide a message to the front-end component of the application indicating how to manage the download event based on the security policy identified by the proxy server based on the metadata.

In an embodiment of the foregoing system, the proxy server is configured to identify the security policy based on the metadata by: comparing the metadata to metadata associated with content of possible download events previously detected by the proxy server; and identifying the security policy based on content of a possible download event whose associated metadata matches the metadata.

In an embodiment of the foregoing system, the message indicating how to manage the download event requests additional data associated with the client-side generated content from the front-end component of the application; and the proxy server is further configured to: receive a message including the additional data from the front-end component of the application, the additional data including the client-side generated content; identify, based on the client-side generated content, a security policy governing user interaction with the application that is relevant to the download event of the client-side generated content; and provide a message to the front-end component of the application indicating how to manage the download event based on the security policy identified by the proxy server based on the client-side generated content.

In another embodiment, a system, comprises a client computing device interconnected to an application server via a proxy server, the client computing device executing a front-end component of an application and the application server executing a back-end component of the application, the front-end component of the application being configured to: receive a message from the proxy server that includes a script generated by the back-end component of the application for the front-end component of the application, the script including code that can prompt a download event of a client-side generated content at the client computer without communicating with the back-end component of the application and the code modified by the proxy server to cause the front-end component of the application to execute a custom code component; and execute the custom code component configured to inspect the code to determine if the code will prompt the download event of the client-side generated file, detect a prompting of the download event, and cancel the download event in response to detecting the prompting of the download event.

In an embodiment of the foregoing system, the client computer is further configured to: receive the custom code component from the proxy server; and inject the custom code component into the front-end component of the application.

In an embodiment of the foregoing system, the custom code component includes a parameter indicating if there are any security policies governing user interaction with the application; and the custom code component is further configured to check the parameter to determine if there are any active security policies governing user interaction with the application before inspecting the code and canceling the download event.

In an embodiment of the foregoing system, the custom code component is further configured to: provide a message to the proxy server inquiring if there are any security policies governing user interaction with the application; receive a message from the proxy server indicating that there is a security policy governing user interaction with the application; and update the parameter to indicate that there are security policies governing user interaction with the application.

In an embodiment of the foregoing system, the custom code component is configured to: provide a message including metadata associated with the client-side generated content to the proxy server; and receive a message from the proxy server indicating how to manage the download event based on a security policy relevant to the download event identified by the proxy server based on the metadata.

In an embodiment of the foregoing system, the message received from the proxy server indicating how to manage the download event requests additional data associated with the client-side generated content; and the custom code component is further configured to: provide a message including the additional data to the proxy server, the additional data including the client-side generated content; and receive a message from the proxy server indicating how to manage the download event based on a security policy relevant to the download event identified by the proxy server based on the client-side generated content.

In an embodiment of the foregoing system, the custom code component is further configured to: manage the download event by: allowing the download event; blocking the download event; providing additional data relating to the download event; or protecting the client-side generated content.

In an embodiment of the foregoing system, the metadata includes one or more of: a name, a size, and a hash associated with the client-side generated content.

In another embodiment, a method is performed by a computing device that is interconnected between a client computer that is executing a front-end component of an application and an application server that is executing a back-end component of the application, comprising: intercepting a message from the back-end component of the application that is directed to front-end component of the application, the message including a script; identifying code in the script that can prompt a download event of a client-side generated content at the client computing device without communicating with the back-end component of the application; modifying the identified code in the script to cause the front-end component of the application to execute a custom code component for inspecting a download event prompted by the identified code in place of executing the identified code, thereby generating a modified script; and providing the modified script to the front-end component of the application.

In an embodiment of the foregoing method, the method further comprises: setting a parameter indicating that there is a security policy governing user interaction with the application, the parameter included in the custom code component; and causing the custom code component to be injected into the front-end component of the application.

In an embodiment of the foregoing method, the method further comprises: receiving a message from the front-end component of the application inquiring if there are any security policies governing user interaction with the application; identifying that there is security policy governing user interaction with the application; and providing a message to the front-end component of the application indicating that there is the security policy governing user interaction with the application.

In an embodiment of the foregoing method, the method further comprises: receiving a message including metadata associated with the client-side generated content from the front-end component of the application; identifying, based on the metadata, a security policy governing user interaction with the application that is relevant to the download event of the client-side generated content; and providing a message to the front-end component of the application indicating how to manage the download event based on the security policy identified by the proxy server based on the metadata.

In an embodiment of the foregoing method, identifying the security policy based on the metadata comprises: comparing the metadata to metadata associated with content of possible download events previously detected by the proxy server; and identifying the security policy based on content of a possible download event whose associated metadata matches the metadata.

In an embodiment of the foregoing method, the message indicating how to manage the download event requests additional data associated with the client-side generated content from the front-end component of the application; and the method further comprises: receiving a message including the additional data from the front-end component of the application, the additional data including the client-side generated content; identifying, based on the client-side generated content, a security policy governing user interaction with the application that is relevant to the download event of the client-side generated content; and providing a message to the front-end component of the application indicating how to manage the download event based on the security policy identified by the proxy server based on the client-side generated content.

V Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A system, comprising:
 a proxy server interconnected between a client computing device and an application server, the client computing device executing a front-end component of an application and the application server executing a back-end component of the application, the proxy server comprising:
  one or more memory devices that store executable program instructions; and
  one or more processors operable to access the memory device(s) and to execute the executable program instructions, the executable program instructions being configured to:
   intercept a message from the back-end component of the application that is directed to the front-end component of the application, the message including a script;
   identify code in the script that can prompt a download event of a client-side generated content at the client computing device without communicating with the back-end component of the application;
   modify the identified code in the script to cause the front-end component of the application to execute a custom code component for inspecting a download event prompted by the identified code in place of executing the identified code, thereby generating a modified script; and
   provide the modified script to the front-end component of the application.

2. The system of claim 1, wherein the executable program instructions are further configured to:
 set a parameter indicating that there is a security policy governing user interaction with the application, the parameter included in the custom code component; and
 cause the custom code component to be injected into the front-end component of the application.

3. The system of claim 1, wherein the executable program instructions are further configured to:
 receive a message from the front-end component of the application inquiring if there are any security policies governing user interaction with the application;
 identify that there is a security policy governing user interaction with the application; and
 provide a message to the front-end component of the application indicating that there is the security policy governing user interaction with the application.

4. The system of claim 1, wherein the executable program instructions are further configured to:
 receive a message including metadata associated with the client-side generated content from the front-end component of the application;
 identify, based on the metadata, a security policy governing user interaction with the application that is relevant to the download event of the client-side generated content; and
 provide a message to the front-end component of the application indicating how to manage the download event based on the security policy identified by the proxy server based on the metadata.

5. The system of claim 4, wherein the executable program instructions are configured to identify the security policy based on the metadata by:
 comparing the metadata to metadata associated with content of possible download events previously detected by the proxy server; and
 identifying the security policy based on content of a possible download event whose associated metadata matches the metadata.

6. The system of claim 4, wherein:
 the message indicating how to manage the download event requests additional data associated with the client-side generated content from the front-end component of the application; and
 the executable program instructions are further configured to:
  receive a message including the additional data from the front-end component of the application, the additional data including the client-side generated content;
  identify, based on the client-side generated content, a security policy governing user interaction with the application that is relevant to the download event of the client-side generated content; and
  provide a message to the front-end component of the application indicating how to manage the download event based on the security policy identified by the proxy server based on the client-side generated content.

7. The system of claim 4, wherein the metadata includes one or more of: a name, a size, and a hash associated with the client-side generated content.

8. A method performed by a computing device that is interconnected between a client computer that is executing a front-end component of an application and an application server that is executing a back-end component of the application, comprising:
 intercepting a message from the back-end component of the application that is directed to the front-end component of the application, the message including a script;

identifying code in the script that can prompt a download event of a client-side generated content at the client computing device without communicating with the back-end component of the application;

modifying the identified code in the script to cause the front-end component of the application to execute a custom code component for inspecting a download event prompted by the identified code in place of executing the identified code, thereby generating a modified script; and providing the modified script to the front-end component of the application.

9. The method of claim 8, further comprising:

setting a parameter indicating that there is a security policy governing user interaction with the application, the parameter included in the custom code component; and causing the custom code component to be injected into the front-end component of the application.

10. The method of claim 8, further comprising:

receiving a message from the front-end component of the application inquiring if there are any security policies governing user interaction with the application;

identifying that there is a security policy governing user interaction with the application; and providing a message to the front-end component of the application indicating that there is the security policy governing user interaction with the application.

11. The method of claim 8, further comprising:

receiving a message including metadata associated with the client-side generated content from the front-end component of the application;

identifying, based on the metadata, a security policy governing user interaction with the application that is relevant to the download event of the client-side generated content; and providing a message to the front-end component of the application indicating how to manage the download event based on the security policy identified by the proxy server based on the metadata.

12. The method of claim 11, wherein identifying the security policy based on the metadata comprises:

comparing the metadata to metadata associated with content of possible download events previously detected by the proxy server; and identifying the security policy based on content of a possible download event whose associated metadata matches the metadata.

13. The method of claim 11, wherein the message indicating how to manage the download event requests additional data associated with the client-side generated content from the front-end component of the application; and wherein the method further comprises:

receiving a message including the additional data from the front-end component of the application, the additional data including the client-side generated content;

identifying, based on the client-side generated content, a security policy governing user interaction with the application that is relevant to the download event of the client-side generated content; and providing a message to the front-end component of the application indicating how to manage the download event based on the security policy identified by the proxy server based on the client-side generated content.

14. The method of claim 11, wherein the metadata includes one or more of: a name, a size, and a hash associated with the client-side generated content.

15. A computer-readable storage medium having computer program logic recorded thereon that when executed by at least one processor causes the at least one processor to perform operations, the operations comprising:

intercepting a message from the back-end component of the application that is directed to the front-end component of the application, the message including a script;

identifying code in the script that can prompt a download event of a client-side generated content at the client computing device without communicating with the back-end component of the application;

modifying the identified code in the script to cause the front-end component of the application to execute a custom code component for inspecting a download event prompted by the identified code in place of executing the identified code, thereby generating a modified script; and providing the modified script to the front-end component of the application.

16. The computer-readable storage medium of claim 15, wherein the operations further comprise:

setting a parameter indicating that there is a security policy governing user interaction with the application, the parameter included in the custom code component; and causing the custom code component to be injected into the front-end component of the application.

17. The computer-readable storage medium of claim 15, wherein the operations further comprise:

receiving a message from the front-end component of the application inquiring if there are any security policies governing user interaction with the application;

identifying that there is a security policy governing user interaction with the application; and providing a message to the front-end component of the application indicating that there is the security policy governing user interaction with the application.

18. The computer-readable storage medium of claim 15, wherein the operations further comprise:

receiving a message including metadata associated with the client-side generated content from the front-end component of the application;

identifying, based on the metadata, a security policy governing user interaction with the application that is relevant to the download event of the client-side generated content; and providing a message to the front-end component of the application indicating how to manage the download event based on the security policy identified by the proxy server based on the metadata.

19. The computer-readable storage medium of claim 18, wherein identifying the security policy based on the metadata comprises:

comparing the metadata to metadata associated with content of possible download events previously detected by the proxy server; and identifying the security policy based on content of a possible download event whose associated metadata matches the metadata.

20. The computer-readable storage medium of claim 18, wherein the message indicating how to manage the download event requests additional data associated with the client-side generated content from the front-end component of the application; and wherein the operations further comprise:

receiving a message including the additional data from the front-end component of the application, the additional data including the client-side generated content;
identifying, based on the client-side generated content, a security policy governing user interaction with the application that is relevant to the download event of the client-side generated content; and
providing a message to the front-end component of the application indicating how to manage the download event based on the security policy identified by the proxy server based on the client-side generated content.

\* \* \* \* \*